(12) United States Patent
Arizpe et al.

(10) Patent No.: US 7,370,174 B2
(45) Date of Patent: May 6, 2008

(54) METHOD, SYSTEM, AND PROGRAM FOR ADDRESSING PAGES OF MEMORY BY AN I/O DEVICE

(75) Inventors: Arturo L. Arizpe, Wimberley, TX (US); Gary Y. Tsao, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 11/029,917

(22) Filed: Jan. 5, 2005

(65) Prior Publication Data

US 2006/0149919 A1 Jul. 6, 2006

(51) Int. Cl.
*G06F 9/26* (2006.01)
*G06F 9/34* (2006.01)
*G06F 12/00* (2006.01)

(52) U.S. Cl. ............... 711/206; 711/137; 711/203; 711/205; 711/207; 711/209

(58) Field of Classification Search ............ 711/108
See application file for complete search history.

(56) References Cited

U.S. PATENT DOCUMENTS

| | | | | |
|---|---|---|---|---|
| 4,903,234 A * | 2/1990 | Sakuraba et al. | ............ | 365/49 |
| 5,214,759 A | 5/1993 | Yamaoka et al. | | |
| 5,263,142 A * | 11/1993 | Watkins et al. | ............ | 710/22 |
| 5,471,618 A | 11/1995 | Isfeld | | |
| 5,479,627 A * | 12/1995 | Khalidi et al. | ............ | 711/205 |
| 5,557,744 A | 9/1996 | Kobayakawa et al. | | |
| 5,564,005 A | 10/1996 | Weber et al. | | |
| 5,566,337 A | 10/1996 | Symanski et al. | | |
| 5,784,707 A * | 7/1998 | Khalidi et al. | ............ | 711/206 |
| 6,021,482 A * | 2/2000 | Wu et al. | ............ | 711/217 |
| 6,549,997 B2 * | 4/2003 | Kalyanasundharam | ...... | 711/207 |
| 6,625,715 B1 * | 9/2003 | Mathews | ............ | 711/207 |
| 6,671,791 B1 * | 12/2003 | McGrath | ............ | 711/206 |
| 6,750,870 B2 | 6/2004 | Olarig | | |
| 6,760,783 B1 | 7/2004 | Berry | | |
| 6,792,483 B2 | 9/2004 | Schmidt | | |
| 6,804,631 B2 | 10/2004 | Kelley et al. | | |
| 7,010,633 B2 | 3/2006 | Arndt et al. | | |
| 7,117,339 B2 * | 10/2006 | Gurumoorthy et al. | ..... | 711/209 |
| 2001/0037397 A1 | 11/2001 | Boucher et al. | | |

(Continued)

OTHER PUBLICATIONS

Computer System; http://web.archive.org/web/20021031123016/http://webopedia.com/TERM/c/computer_system.html; p. 1; Wednesday, Oct. 31, 2001.*

(Continued)

*Primary Examiner*—Pierre Bataille
*Assistant Examiner*—Christopher D Birkhimer
(74) *Attorney, Agent, or Firm*—Konrad Raynes & Victor LLP (57) ABSTRACT

Provided are a method, system, and program for translating virtual addresses of memory locations within pages of different sizes. In one embodiment, a translation entry containing a physical address is stored in a data structure table for each page. Each virtual address includes a page virtual address which identifies the translation entry containing the physical address of the page containing the memory location. The virtual address may be translated to a translation entry index using the size of the page containing the memory location.

37 Claims, 6 Drawing Sheets

U.S. PATENT DOCUMENTS

| | | |
|---|---|---|
| 2002/0152327 A1 | 10/2002 | Kagan et al. |
| 2003/0065856 A1 | 4/2003 | Kagan et al. |
| 2004/0017819 A1 | 1/2004 | Kagan et al. |
| 2004/0027374 A1 | 2/2004 | Cirne et al. |
| 2004/0103225 A1 | 5/2004 | McAlpine et al. |
| 2004/0237093 A1 | 11/2004 | Sluiman et al. |
| 2005/0080928 A1 | 4/2005 | Beverly et al. |
| 2005/0144402 A1 | 6/2005 | Beverly |
| 2005/0216597 A1 | 9/2005 | Shah et al. |
| 2005/0228920 A1 | 10/2005 | Shah et al. |
| 2005/0228922 A1 | 10/2005 | Tsao et al. |
| 2006/0004795 A1 | 1/2006 | Shah et al. |
| 2006/0004941 A1 | 1/2006 | Shah et al. |
| 2006/0004983 A1 | 1/2006 | Tsao et al. |
| 2006/0133396 A1 | 6/2006 | Shah et al. |
| 2006/0136697 A1 | 6/2006 | Tsao et al. |
| 2006/0235999 A1 | 10/2006 | Shah et al. |

OTHER PUBLICATIONS

Buonadonna, P., and D. Culler, "Queue Pair IP: A Hybrid Architecture for System Area Networks", Proceedings of the 29th Annual International Symposium on Computer Architecture, 2002, pp. 247-256.

Correia, P., "Developing a Third Generation I/O Specification", Intel Developer Update Magazine, Mar. 2002, pp. 1-4.

Culley, P., U. Elzur, R. Recio, & S. Bailer, "Marker PDU Aligned Framing for TCP Specification (Version 1.0)," Release Specification of the RDMA Consortium, Oct. 25, 2002, 32 pp.

Deyring, K. (Ed.), "Serial ATA: High Speed Serialized AT Attachment", Rev. 1.0, Aug. 29, 2001, 36 pp.

EP Office Action, Feb. 9, 2006, for International Application No. 03 812 441.8-22111.

Hilland, J., P. Culley, J. Pinkerton, & R. Recio, "RDMA Protocol Verbs Specification (Version 1.0)," Release Specification of the RDMA Consortium, Apr. 2003, 243 pp.

Infiniband, "InfiniBand Architecture Specification vol. 1", Release 1.0, Oct. 24, 2000, Ch. 1-8, pp. 1-195.

Infiniband, "InfiniBand Architecture Specification vol. 1", Release 1.0, Oct. 24, 2000, Ch. 9-10, pp. 196-445.

Infiniband, "InfiniBand Architecture Specification vol. 1", Release 1.0, Oct. 24, 2000. Ch. 11-14, pp. 446-669.

Infiniband, "InfiniBand Architecture Specification vol. 1", Release 1.0, Oct. 24, 2000, Ch. 15-20, pp. 670-880.

Infiniband, "InfiniBand Architecture Specification vol. 2", Release 1.0, Oct. 24, 2000, Ch. 1-11, pp. 1-319.

Infiniband, "InfiniBand Architecture Specification vol. 2", Release 1.0, Oct. 24, 2000, Ch. 12-Appendix D, pp. 320-623.

Institute of Electrical and Electronics Engineers, Inc., "IEEE Std. 802.11b-1999", Sep. 16, 1999, 17 pp.

Institute of Electrical and Electronics Engineers, Inc., "IEEE Std. 802.3- 2002", Mar. 8, 2002, 33 pp.

Microsoft Corporation, "Interrupt Architecture Enhancements in Microsoft Windows, Codenamed "Longhorn"", Windows Platform Design Notes, © 2003 Microsoft Corporation, 42 pp.

PCI Special Interest Group, "PCI Local Bus Specification Rev. 2.3: PCI Engineering Change Notice—MSI-X", Jun. 10, 2003, 23 pp.

PCI Special Interest Group, PCI-SIG 2004; web pages including Mar. 20, 2002 news release "PCI-SIG Releases New PCI Version 2.3 Local Bus Specification for Migration to Low-Voltage Designs," 18 pp. Available from the Internet at <URL: http://www.pcisig.com>.

PCT International Search Report, Aug. 9, 2004, for International Application No. PCT/US03/37254.

Penokie, G.O. (Ed.), "Information Technology- SCSI Controller Commands-2 (SCC-2)", T10/Project 1225D, Revision 4, Sep. 12, 1997, 24 pp.

Rangarajan, M., A. Bohra, K. Banerjee, E.V. Carrera, and R. Bianchini, "TCP Servers: Offloading TCP Processing in Internet Servers. Design, Implementation, and Performance", Technical Report, Rutgers University, 2002, pp. 1-14.

RDMA Consortium, "Architectural Specifications for RDMA over TCP/IP", [online], 2005, [retrieved on Dec. 22, 2005], retrieved from the Internet at <URL: http://www.rdmaconsortium.org/home>.

Recio, R., P. Culley, D. Garcia, & J. Hilland, "An RDMA Protocol Specification (Version 1.0)," Release Specification of the RDMA Consortium, Oct. 2002, 60 pp.

Salzmann, T., and M. Peppel, "GTO Driving Protection Technique with Status Monitoring", IEEE Transactions on Industry Applications, vol. 24, Issue 1, Part 1, 1998, pp. 115-120. [Abstract].

Shah, H., J. Pinkerton, R. Recio, & P. Culley, "Direct Data Placement over Reliable Transports (Version 1.0)," Release Specification of the RDMA Consortium, Oct. 2002, 35 pp.

Shanley, T. and D. Anderson, (Eds.), "PCI System Architecture," 4th ed.; TOC pp. v-xlii; Intro. pp. 1-6; Chapter 1 pp. 7-13; Chapter 2 pp. 15-21; 1999.

Stevens, R.W., "UNIX Network Programming", 1990, pp. 209-210.

US Final Office Action, May 24, 2006, for U.S. Appl. No. 10/815,902.

US First Office Action, Dec. 13, 2005, for U.S. Appl. No. 10/815,902.

US First Office Action, Mar. 10, 2006, for U.S. Appl. No. 10/816,435.

"Virtual Interface Architecture Specification", Draft Revision 1.0, Dec. 4, 1997, 83 pp.

Wangdee, W. and R. Billinton, "Utilization of Time Varying Event-based Customer Interruption Cost Load Shedding Schemes", 2004 International Conference on Probabilistic Methods Applied to Power Systems, Sep. 2004, pp. 769-775. [Abstract].

Weber, R., M. Rajagopal, F. Travostino, M. O'Donnell, C. Monia, & M. Merhar, "Fibre Channel (FC) Frame Encapsulation," Network Working Group, RFC 3643, Dec. 2003, 17 pp.

\* cited by examiner

METHOD, SYSTEM, AND PROGRAM FOR ADDRESSING PAGES OF MEMORY BY AN I/O DEVICE

BACKGROUND

In a network environment, a network adapter or controller on a host computer, such as an Ethernet controller, Fibre Channel controller, etc., will receive Input/Output (I/O) requests or responses to I/O requests initiated from the host computer. Often, the host computer operating system includes a device driver to communicate with the network controller hardware to manage I/O requests to transmit over a network. The host computer may also utilize a protocol which packages data to be transmitted over the network into packets, each of which contains a destination address as well as a portion of the data to be transmitted. Data packets received at the network controller are often stored in a packet buffer. A transport protocol layer can process the packets received by the network controller that are stored in the packet buffer, and access any I/O commands or data embedded in the packet.

For instance, the computer may employ the TCP/IP (Transmission Control Protocol/Internet Protocol) to encode and address data for transmission, and to decode and access the payload data in the TCP/IP packets received at the network controller. IP specifies the format of packets, also called datagrams, and the addressing scheme. TCP is a higher level protocol which establishes a connection between a destination and a source and provides a byte-stream, reliable, full-duplex transport service. Another protocol, Remote Direct Memory Access (RDMA) on top of TCP provides, among other operations, direct placement of data at a specified memory location at the destination.

A device driver, program or operating system can utilize significant host processor resources to handle network transmission requests to the network controller. One technique to reduce the load on the host processor is the use of a TCP/IP Offload Engine (TOE) in which TCP/IP protocol related operations are carried out in the network controller hardware as opposed to the device driver or other host software, thereby saving the host processor from having to perform some or all of the TCP/IP protocol related operations. Similarly, an RDMA-enabled Network Interface Controller (RNIC) offloads RDMA and transport related operations from the host processor(s).

Figure 1:
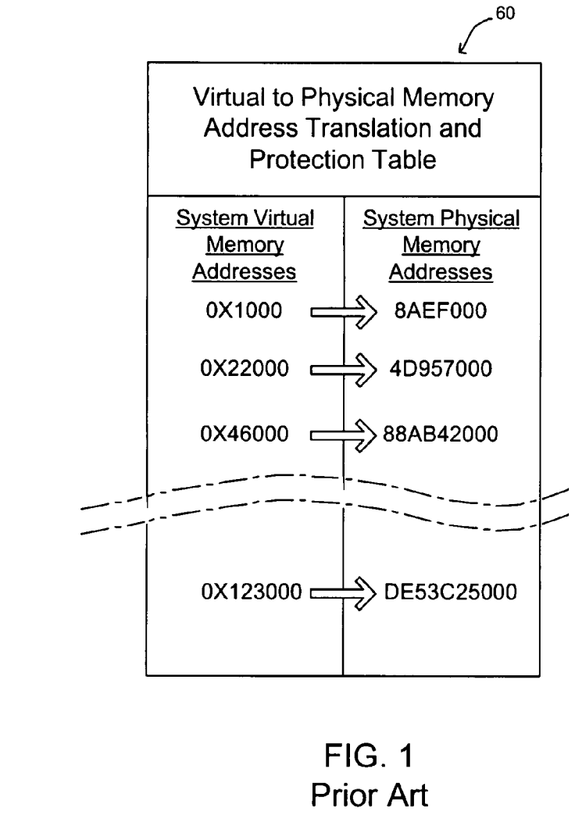
FIG. 1 illustrates a prior art system virtual to physical memory address translation and protection table.

The operating system of a computer typically utilizes a virtual memory space which is often much larger than the memory space of the physical memory of the computer. FIG. 1 shows an example of a typical system translation and protection table (TPT) 60 which the operating system utilizes to map virtual memory addresses to real physical memory addresses with protection at the process level.

In some known designs, an I/O device such as a network controller or a storage controller may access large amounts of memory to maintain connection and message context information. For example, some network controllers use host or system memory to maintain context or payload information instead of using local memory.

The address of the application buffer which is the destination of the Remote Direct Memory Access (RDMA) operation is frequently carried in the RDMA packets in some form of a buffer identifier and a virtual address or offset. The buffer identifier identifies which buffer the data is to be written to or read from. The virtual address or offset carried by the packets identifies the location within the identified buffer for the specified direct memory operation.

Figure 2:
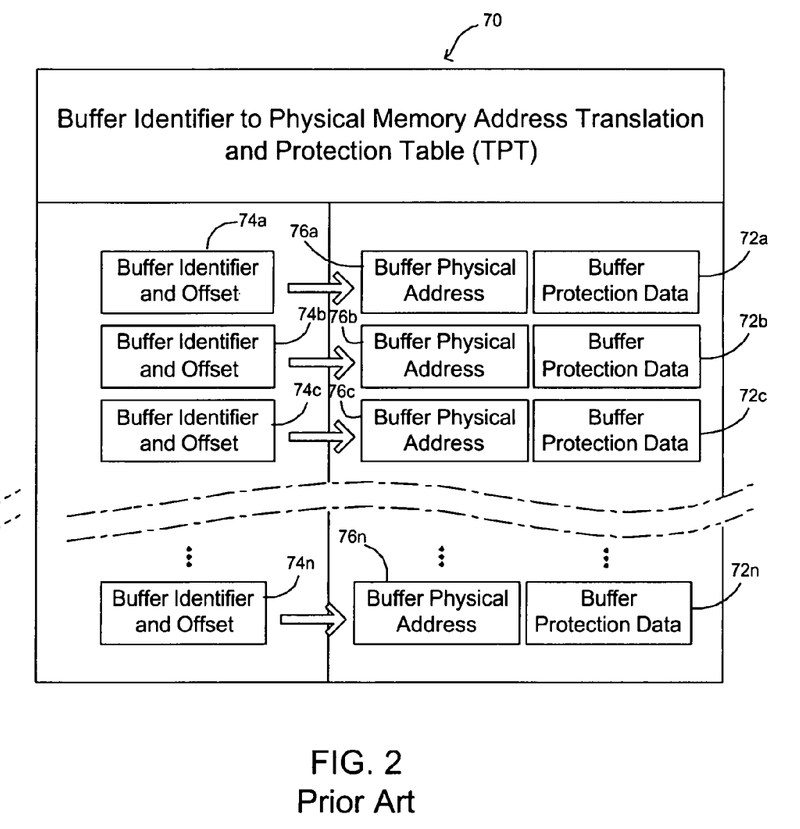
FIG. 2 illustrates a prior art translation and protection table for an I/O device.

In order to perform direct data placement, an I/O device typically maintains its own translation and protection table, an example of which is shown at 70 in FIG. 2. The device TPT 70 contains data structures 72*a*, 72*b*, 72*c* . . . 72*n*, each of which is used to control access to a particular buffer as identified by an associated buffer identifier of the buffer identifiers 74*a*, 74*b*, 74*c* . . . 74*n*. The device TPT 70 further contains data structures 76*a*, 76*b*, 76*c* . . . 76*n*, each of which is a Translation Entry (TE) used to translate the buffer identifier and virtual address or offset into physical memory addresses of the particular buffer identified by the associated buffer identifier 74*a*, 74*b*, 74*c* . . . 74*n*. Thus, for example, the TE 76*a* of the TPT 70 is used by the I/O device to perform address translation for the buffer identified by the identifier 74*a*. Similarly, the data structure 72*a* is used by the I/O device to perform protection checks for the buffer identified by the buffer identifier 74*a*. The TE's 76*a*, 76*b* . . . 76*n* of the TPT 70 may be collectively referred to as an Address Translation Table (ATT) which typically is a portion of the TPT 70. The address translation and protection checks may be performed prior to direct data placement of the payload contained in a packet received from the network or prior to sending the data out on the network.

A buffer identifier and associated virtual address or offset may be used to generate an index to the TE's of the I/O device TPT 70. Each TE typically contains the physical address of a single page.

In order to facilitate high-speed data transfer, a device TPT such as the TPT 70 is typically managed by the I/O device, the driver software for the device or both. A device TPT can occupy a relatively large amount of memory. For example, each TE can occupy 64 bits. As a consequence, a TPT is frequently resident in the system or host memory. The I/O device may maintain a cache of a portion of the device TPT to reduce access delays.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodiments of the present disclosure. It is understood that other embodiments may be utilized and structural and operational changes may be made without departing from the scope of the present description.

Figure 3:
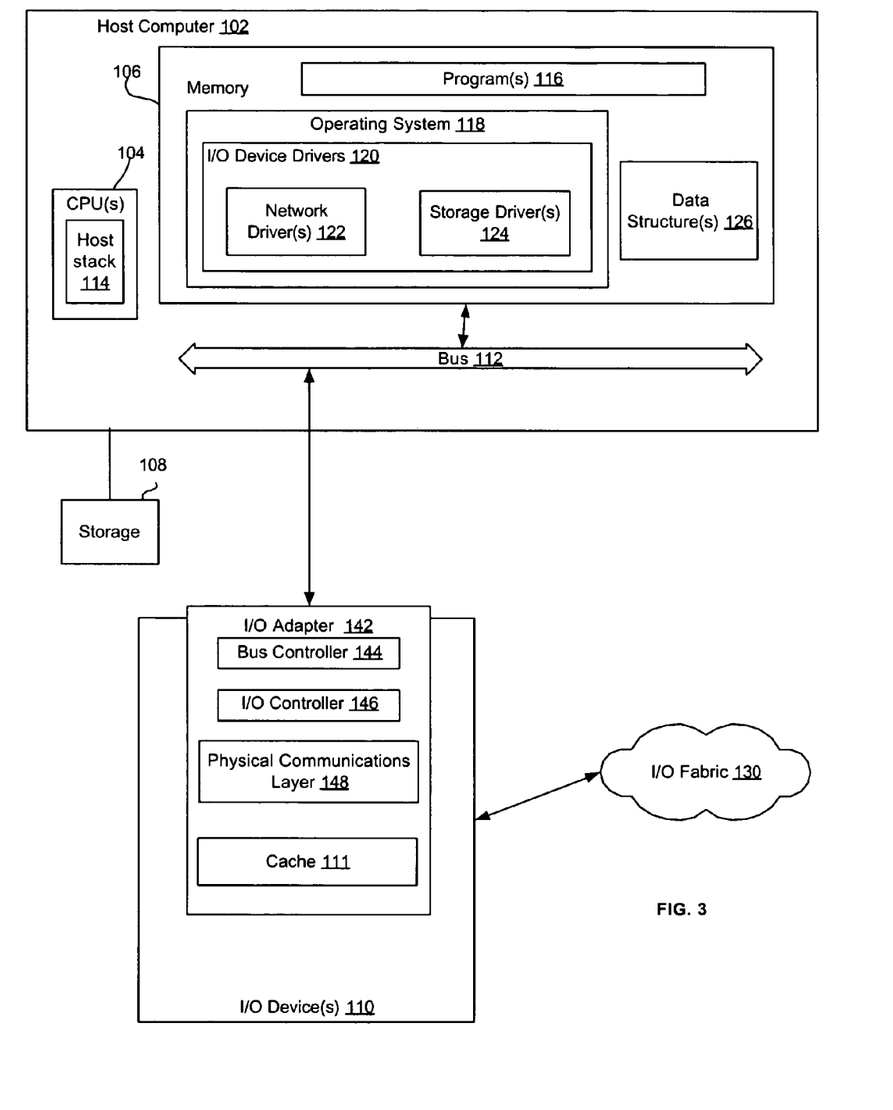
FIG. 3 illustrates one embodiment of a computing environment in which aspects of the description provided herein are embodied.

FIG. 3 illustrates a computing environment in which aspects of described embodiments may be employed. A host computer 102 includes one or more central processing units (CPUs) 104, a volatile memory 106 and a non volatile storage 108 (e.g., magnetic disk drives, optical disk drives, a tape drive, etc.). The host computer 102 is coupled to one or more Input/Output (I/O) devices 110 via one or more busses such as a bus 112. In the illustrated embodiment, the I/O device 110 is depicted as a part of a host system, and includes a network controller such as an RNIC. Any number of I/O devices may be attached to host computer 102. An I/O device in accordance with embodiments described herein may include a network controller or adapter or a storage controller or other devices utilizing memory. An I/O device 110 may also have a cache 111 which includes cache entries to store a portion of a data structure table.

In accordance with one aspect of the description provided herein, as described in greater detail below, a translation entry (TE) of an address translation table (ATT) may contain the physical address of a contiguous block of physical pages. Moreover, the size of each block of contiguous physical pages may vary. As used herein, the term "page" refers to a single physical page or a block of contiguous physical pages of memory. In one application, the number of TE's used to map a memory of a given size may be reduced. However, it is appreciated that in other applications, aspects of the present description may be applied to achieve other results.

The host computer 102 uses I/O devices in performing I/O operations (e.g., network I/O operations, storage I/O operations, etc.). Thus, an I/O device 110 may be used as a storage controller for storage such as the storage 108, for example, which may be directly connected to the host computer 102 by a bus such as the bus 112, or may be connected by a network.

A host stack 114 executes on at least one CPU 104. A host stack may be described as software that includes programs, libraries, drivers, and an operating system that run on host processors (e.g., CPU 104) of a host computer 102. One or more programs 116 (e.g., host software, application programs, and/or other programs) and an operating system 118 reside in memory 106 during execution and execute on one or more CPUs 104. One or more of the programs 116 is capable of transmitting and receiving packets from a remote computer.

The host computer 102 may comprise any computing device known in the art, such as a mainframe, server, personal computer, workstation, laptop, handheld computer, telephony device, network appliance, virtualization device, storage controller, etc. Any CPU 104 and operating system 118 known in the art may be used. Programs and data in memory 106 may be swapped between memory 106 and storage 108 as part of memory management operations.

Operating system 118 includes I/O device drivers 120. The I/O device drivers 120 include one or more network drivers 122 and one or more storage drivers 124 that reside in memory 106 during execution. The network drivers 122 and storage drivers 124 may be described as types of I/O device drivers 120. Also, one or more data structures 126 are in memory 106.

Each I/O device driver 120 includes I/O device specific commands to communicate with an associated I/O device 110 and interfaces between the operating system 118, programs 116 and the associated I/O device 110. The I/O devices 110 and I/O device drivers 120 employ logic to process I/O functions.

Each I/O device 110 includes various components found in the hardware of the I/O device 110. The I/O device 110 of the illustrated embodiment is capable of transmitting and receiving packets of data over I/O fabric 130, which may comprise a Local Area Network (LAN), the Internet, a Wide Area Network (WAN), a Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

Each I/O device 110 includes an I/O adapter 142, which in certain embodiments, is a Host Bus Adapter (HBA). In the illustrated embodiment, an I/O adapter 142 includes a bus controller 144, an I/O controller 146, and a physical communications layer 148. The cache 111 is shown coupled to the adapter 142 but may be a part of the adapter 142. The bus controller 144 enables the I/O device 110 to communicate on the computer bus 112, which may comprise any bus interface known in the art, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2003), or a PCI Express bus (PCI Special Interest Group, PCI Express Base Specification 1.0a, published 2003), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc.

The I/O controller 146 provides functions used to perform I/O functions. The physical communication layer 148 provides functionality to send and receive network packets to and from remote data storages over an I/O fabric 130. In certain embodiments, the I/O adapters 142 may utilize the Ethernet protocol (IEEE std. 802.3, published Mar. 8, 2002) over unshielded twisted pair cable, token ring protocol, Fibre Channel (IETF RFC 3643, published December 2003), Infiniband, or any other networking and storage protocol known in the art. The I/O device 110 may be integrated into the CPU chipset, which can include various controllers including a system controller, peripheral controller, memory controller, hub controller, I/O bus controller, etc.

An I/O device 110 may also be a storage controller which controls the reading of data from and the writing of data to the storage 108 in accordance with a storage protocol layer. The storage protocol may be any of a number of known storage protocols including Redundant Array of Independent Disks (RAID), High Speed Serialized Advanced Technology Attachment (SATA), parallel Small Computer System Interface (SCSI), serial attached SCSI, etc. Data being written to or read from the storage 108 may be cached in a cache in accordance with known caching techniques. The storage controller may be integrated into the CPU chipset, which can include various controllers including a system controller, peripheral controller, memory controller, hub controller, I/O bus controller, etc.

The I/O devices 110 may include additional hardware logic to perform additional operations to process received packets from the host computer 102 or the I/O fabric 130. For example, the I/O device 110 of the illustrated embodiment includes a network protocol layer to send and receive network packets to and from remote devices over the I/O fabric 130. The I/O device 110 can control other protocol layers including a data link layer and the physical layer 148 which includes hardware such as a data transceiver.

Still further, the I/O devices 110 may utilize a TOE to provide the transport protocol layer in the hardware or firmware of the I/O device 110 as opposed to the I/O device drivers 120 or host software, to further reduce host computer 102 processing burdens. Alternatively, the transport layer may be provided in the I/O device drivers 120 or other drivers (for example, provided by an operating system).

The transport protocol operations include packaging data in a TCP/IP packet with a checksum and other information, and sending the packets. These sending operations are performed by an agent which may be embodied with a TOE, a network interface card or integrated circuit, a driver, TCP/IP stack, a host processor or a combination of these elements. The transport protocol operations also include receiving a TCP/IP packet from over the network and unpacking the TCP/IP packet to access the payload data. These receiving operations are performed by an agent which, again, may be embodied with a TOE, a network interface card or integrated circuit, a driver, TCP/IP stack, a host processor or a combination of these elements.

The network layer handles network communication and provides received TCP/IP packets to the transport protocol layer. The transport protocol layer interfaces with the device driver 120 or an operating system 118 or a program 116, and performs additional transport protocol layer operations, such as processing the content of messages included in the packets received at the I/O device 110 that are wrapped in a transport layer, such as TCP, the Internet Small Computer System Interface (iSCSI), Fibre Channel SCSI, parallel SCSI transport, or any transport layer protocol known in the art. The TOE of the transport protocol layer can unpack the payload from the received TCP/IP packet and transfer the data to the device driver 120, a program 116 or the operating system 118.

In certain embodiments, the I/O device 110 can further include one or more RDMA protocol layers as well as the transport protocol layer. For example, the I/O device 110 can employ an RDMA offload engine, in which RDMA layer operations are performed within the hardware or firmware of the I/O device 110, as opposed to the device driver 120 or other host software.

Thus, for example, a program 116 transmitting messages over an RDMA connection can transmit the message through the RDMA protocol layers of the I/O device 110. The data of the message can be sent to the transport protocol layer to be packaged in a TCP/IP packet before transmitting it over the I/O fabric 130 through the network protocol layer and other protocol layers including the data link and physical protocol layers.

Thus, in certain embodiments, the I/O devices 110 may include an RNIC. Examples herein may refer to RNICs merely to provide illustrations of the applications of the descriptions provided herein and are not intended to limit the description to RNICs. In an example of one application, an RNIC may be used for low overhead communication over low latency, high bandwidth networks. Details on the TCP protocol are described in "Internet Engineering Task Force (IETF) Request for Comments (RFC) 793," published September 1981, details on the IP protocol are described in "Internet Engineering Task Force (IETF) Request for Comments (RFC) 791, published September 1981, and details on the RDMA protocol are described in the technology specification "Architectural Specifications for RDMA over TCP/IP" Version 1.0 (October 2003).

Figure 4:
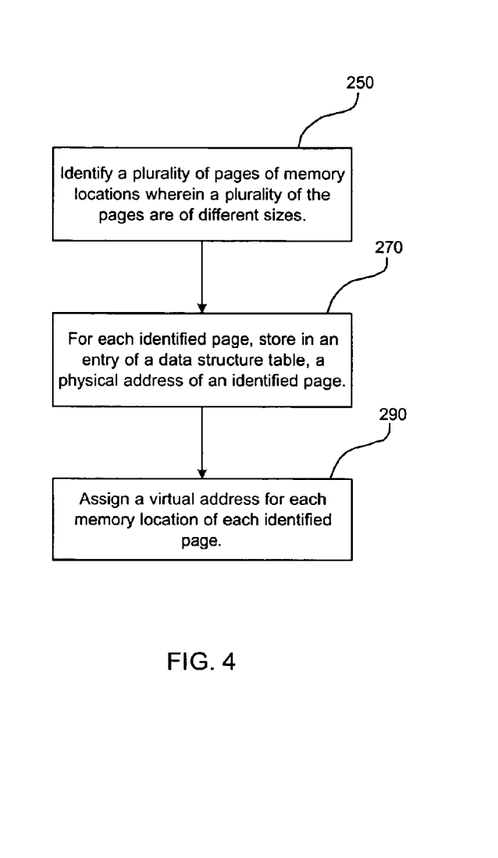
FIG. 4 illustrates one embodiment of operations performed to organize memory allocated to an I./O device into pages of variable size.

FIG. 4 shows one example of operations of a driver such as a network driver 122 for an I/O device such as the I/O device 110, to organize memory allocated to the I/O device into pages of variable size. This memory may be within the host memory 106 and allocated to the I/O device 110 by the operating system 118, or may be other memory such as a private side memory coupled to the I/O device and allocated by the I/O device 110 for use by the I/O device 110. The driver 122 identifies (block 250) a plurality of pages of memory locations wherein a plurality of the pages are of different sizes. For example, one or more identified pages may each contain multiples of a page size such as 4K bytes. Thus, for example, one or more pages may contain 4K bytes each, one or more identified pages may each contain 8K bytes each, one or more identified pages may each contain 16K bytes, etc. In the illustrated embodiment, the physical memory locations within each identified page of memory are contiguous.

Figure 5:
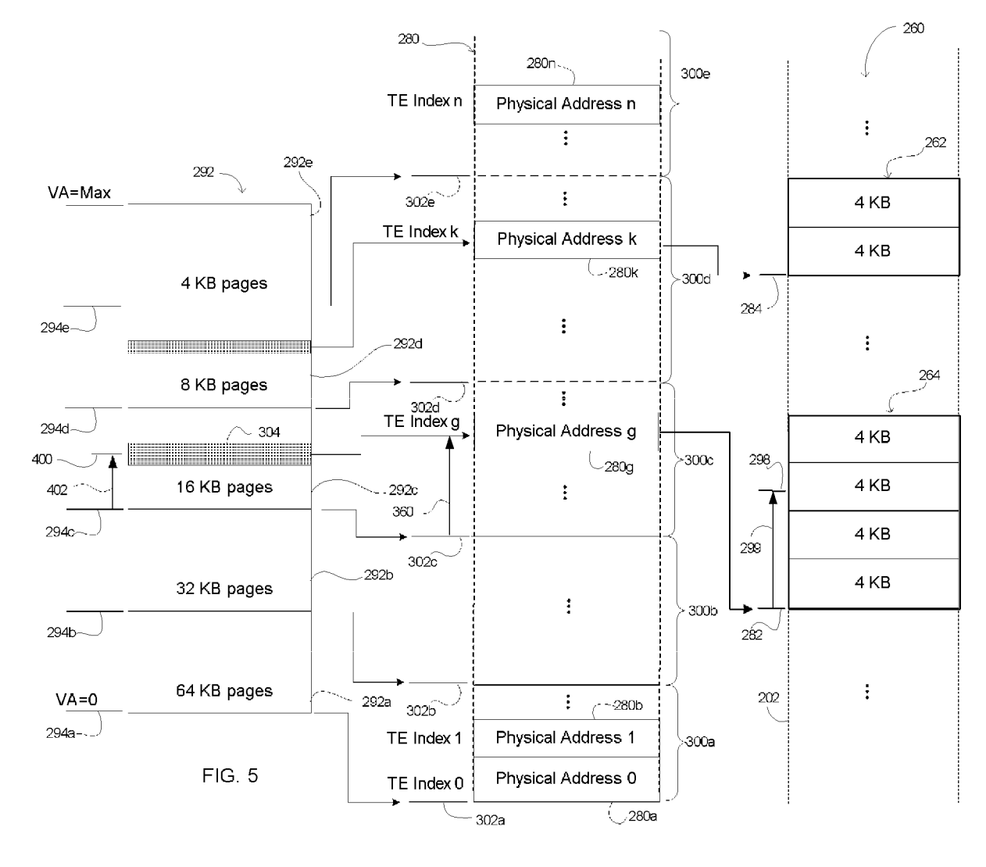
FIG. 5 is a schematic diagram illustrating one embodiment of operations performed to translate a virtual address of a memory location within a page of various sizes, to a physical memory address.

FIG. 5 shows an example of a portion 260 of the host memory 106 which has been allocated by the operating system 118 for use by an I/O device 110. Representative of this portion 260 is a page 262 containing 8K bytes of contiguous memory, and a page 264 containing 16K bytes of contiguous memory. All 8K bytes of the page 262 are contiguous within the page 262 and all 16 K bytes of the page 264 are contiguous within the page 264. However, in this example, the page 262 is not contiguous to the page 264. Instead, there are memory locations of the host memory 106 which have not been allocated to the host device 110 and have physical addresses between the physical addresses of the pages 262 and 264.

For each identified page, the driver 122 stores (block 270) in an entry of a data structure table, a physical address of an identified page. FIG. 5 also shows an example of a data structure table, which in this example, is an address translation table (ATT) 280 comprising a plurality of translation entries (TEs) 280a, 280b . . . 280n. Thus, in this example, the first or base physical address of the page 264, represented at 282, may be stored in a translation entry such as translation entry 280g, and the base physical address of the page 262, represented at 284, may be stored in a translation entry 280k, for example.

Figure 6:
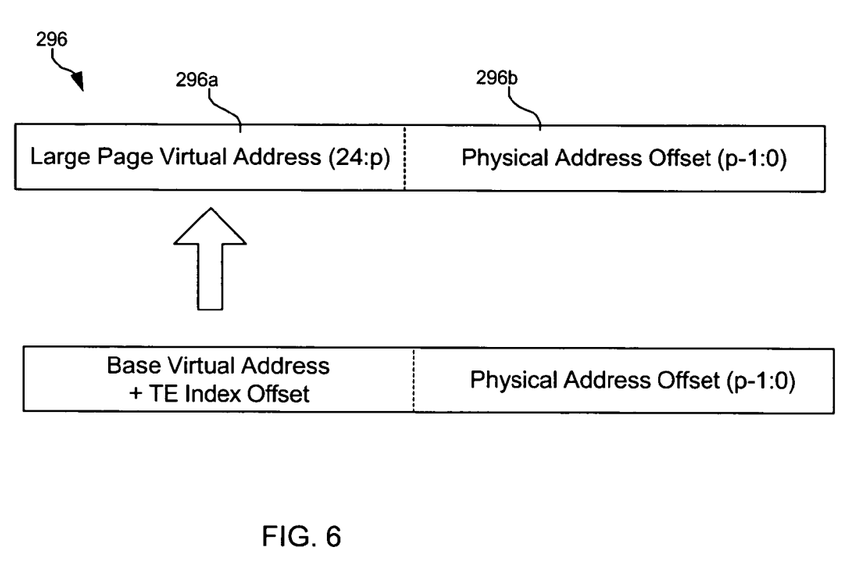
FIG. 6 illustrates one embodiment of a format of a virtual address for a memory location within a page of various sizes.

The driver 122 may assign (block 290) a virtual address (VA) for each memory location of each identified page. FIG. 5 shows an example of a virtual address space 292 which may contain a unique virtual address for each memory location of the pages of the memory portion 260 allocated to the I/O device 110. FIG. 6 shows an example of a virtual address 296 which can uniquely identify a particular memory location. In this example, the virtual address 296 includes a virtual address 296a which identifies the particular page which contains the particular memory location. The virtual address 296 also includes a physical address offset 296b which identifies the particular memory location within the particular page of the virtual address 296. In this example, the physical address offset 296b is an offset relative to the base physical address of the particular page containing the particular memory location. Thus, for example, FIG. 5 shows a memory location within the 16 KB page 264 having a physical address represented at 298. The physical address 298 is offset from the page base physical address 282 by a physical address offset 299.

Table 1 shows an example of a plurality of pages of different sizes being identified in a portion of the host memory 106, 20 megabytes (MB) in this example, which has been allocated to the driver 122. It is appreciated that a larger or smaller portion may be allocated in other applications.

TABLE 1

Allocated Pages Sorted by Page Size

| Large Page Size (KB) | Number of Large Pages | Base Virtual Address |
| --- | --- | --- |
| 4 | 1024 | 0x1000000 |
| 8 | 512 | 0x0C00000 |
| 16 | 256 | 0x0800000 |
| 32 | 128 | 0x0400000 |
| 64 | 64 | 0x0000000 |

In this example, as shown in Table 1, the driver 122 identifies 64 pages which are each 64 kilobytes (KB) in size, 128 pages which are each 32 KB in size, 256 pages which are each 16 KB in size, etc. As previously mentioned, the memory locations within each large page are contiguous. Thus, a page 64 KB in size has 64 K contiguous memory locations, each memory location being one byte in size. The identified pages are sorted by page size in the entries of Table 1. When a large page size which is not a power-of-2; for example, a 12 KB page size, can be separated into a 8 KB page and a 4 KB page in Table 1.

Memory may be allocated to the driver 122, identified, and sorted by page size using a variety of different operations. For example, the full 20 MB of memory may be allocated to the driver 122 at once. The driver 122 can scan the allocated memory, identify the blocks of contiguous memory which may be utilized as large pages. The identified pages may be sorted by size as shown in Table 1.

In alternative operations, the driver 122 can request allocation of a page of contiguous memory of a particular size, such as 64 KB, for example, and continue requesting 64 KB pages of contiguous memory until denied by the operating system 118. The number of 64 KB pages granted to the driver 122 may be stored in a table such as Table 1. Thus, in this example, the driver 122 was granted 64 pages which are each 64 KB in size.

Once denied allocation of a page of a certain size, the driver 122 can reduce the size of the requested page. For example, the driver 122 can request pages of 32 KB size until denied. The number of 32 KB pages granted to the driver 122 may be stored as shown in Table 1. In the example of Table 1, the driver was allocated 128 pages which are each 32 KB in size.

Once denied allocation of a 32 KB page, the driver 122 can request pages of yet a smaller size such as 16 KB, for example. The number of 16 KB pages granted to the driver 122 may be stored as shown in Table 1. In the example of Table 1, the driver 122 was allocated 256 pages which are each 16 KB in size. The driver 122 can continue requesting pages of increasingly smaller size until the pages of the smallest size appropriate for a particular application have been identified in the table. In the example of Table 1, the smallest page size is 4 KB and 1024 pages which are each 4 KB in size were allocated to the driver 122.

In some applications, sorting the allocated pages by page size can facilitate an efficient assigning of virtual addresses to the memory locations of the allocated pages. As previously mentioned, FIG. 5 shows an example of a virtual address space 292 which may contain a unique virtual address for each memory location of the pages of the memory portion 260 allocated to the I/O device 110. As shown in FIG. 5, the virtual address space 292 may be subdivided into a plurality of contiguous blocks, blocks 292a, 292b, 292c, 292d, 292e, in which the virtual addresses in each block are contiguous and pertain to pages of the same size. Moreover, the contiguous blocks 292a, 292b, 292c, 292d, 292e are arranged in order of decreasing page size. Thus, in this example, virtual address block 292a contains the virtual addresses of the memory locations of the pages of 64 KB size, virtual address block 292b contains the virtual addresses of the memory locations of the pages of 32 KB size, etc. It is appreciated that the virtual addresses assigned the memory locations of the pages of varying size may be selected in a variety of arrangements, depending upon the particular application. For example, in some embodiments, the base virtual address blocks need not be contiguous nor arranged in order of decreasing page size. Other arrangements may also be used, the structures of which will depend upon the particular application.

Each virtual address block 292a, 292b, 292c, 292d, 292e has a base virtual address 294a, 294b, 294c, 294d, 294e, respectively, which, in the illustrated embodiment, is the virtual address of the first memory location of each block. Thus, the base virtual address 294a of the virtual address block 292a for the 64 KB size pages is VA=0x0000000 as shown in Table 1. The base virtual address 294b of the virtual address block 292b for the 32 KB size pages is VA=0x0400000, etc. These base virtual addresses are provided as an example. The actual values will depend upon a number of factors including the virtual address space chosen, the arrangements of the pages within the virtual address space, the sizes of the pages and the number of pages of each size, etc.

As previously mentioned, each virtual address 296 (FIG. 6) of the virtual address space 292 includes a page virtual address 296a which identifies the particular page which contains the particular memory location. In the illustrated embodiment, the page virtual address 296a identifies a particular translation entry 280a, 280b . . . 280n of the address translation table 280. In this example, the identified address translation entry 280a, 280b . . . 280n contains the first physical address of the page addressed by the page virtual address.

In the illustrated embodiment, the page virtual address 296a of each virtual address 296 is derived from the base virtual address 294a, 294b, 294c, 294d, 294e of the page, which is combined with an address translation entry index offset (TE Index Offset) as shown in FIG. 6. As explained below, the base virtual address 294a, 294b, 294c, 294d, 294e of the page together with an address translation entry index offset may be utilized to identify the particular translation entry 280a, 280b . . . 280n of the address translation table 280 which contains the physical address of the page.

In this example, the address translation entries 280a, 280b . . . 280n are arranged in contiguous segments 300a, 300b, 300c, 300d and 300e, one such segment 300a, 300b, 300c, 300d and 300e for each virtual address block 292a, 292b, 292c, 292d, 292e, respectively. Each translation entry 280a, 280b . . . 280n of the address translation table 280 may be addressed by a translation entry index, TE index 0, TE index 1 . . . TE index n, respectively. Each translation entry segment 300a, 300b, 300c, 300d and 300e has a base translation entry index 302a, 302b, 302c, 302d and 302e wherein the base translation entry index addresses the first translation entry of the particular segment.

As previously mentioned, the base virtual address 294a, 294b, 294c, 294d, 294e, is the virtual address of the first memory location of each virtual address block 292a, 292b, 292c, 292d, 292e, respectively. Thus, for each base virtual address 294a, 294b, 294c, 294d, 294e, a base translation entry index may be assigned which addresses the first translation entry of the table segment 300a, 300b, 300c, 300d and 300e containing the physical addresses of the pages of the associated virtual address block 292a, 292b, 292c, 292d, 292e.

For example, the driver 122 may write in the I/O device 110 a table referred to herein as a Private Memory Descriptor Table, as example of which is set forth below in Table 2. As shown therein, one column describes the sizes of the pages which have been allocated. For each page size, the table identifies selected bits of the base virtual address 294a, 294b, 294c, 294d, 294e of the associated virtual address block 292a, 292b, 292c, 292d, 292e assigned to pages of that size. In this example, the selected bits include bits [24:12] of the base virtual address. The smallest page size in this example is 4K (or $2^{12}$) bytes. Accordingly, the 12 least significant bits [11:0] of the base virtual address may be omitted from the table in this example. The table also identifies for each page size, the base translation entry index 302a, 302b, 302c, 302d and 302e of the table segment 300a, 300b, 300c, 300d and 300e containing the physical addresses of each of the pages of that particular size.

TABLE 2

Private Memory Descriptor Table

| Large Page Size (KB) | Base Virtual Address [24:12] | Base TE Index |
|---|---|---|
| 4 | 0x1000 | 960 |
| 8 | 0x0C00 | 448 |
| 16 | 0x0800 | 192 |
| 32 | 0x0400 | 64 |
| 64 | 0x0000 | 0 |

For example, the pages which are 64 KB in size have assigned virtual addresses which are in virtual address block 292a which has a base virtual address 0x0000000 or 0x0000 [24:12] as shown in Table 2. In addition, the pages which are 64 KB in size have physical addresses stored in translation entry segment 300a, which has a base translation entry index 0 as shown in Table 2.

Similarly, the pages which are 32 KB in size have assigned virtual addresses which are in virtual address block 292b which has a base virtual address 0x0400000 or 0x0400 [24:12] as shown in Table 2. In addition, the pages which are 32 KB in size have physical addresses stored in translation entry segment 300b, which has a base translation entry index 64 as shown in Table 2, because there are 64 translation entries preceding in the data structure table 280. These preceding 64 entries are translation entry index 0 to translation entry index 63 for the 64 larger pages of 64 KB size as shown in Table 1.

Similarly, the pages which are 16 KB in size have assigned virtual addresses which are in virtual address block 292c which has a base virtual address 0x0800000 or 0x0800 [24:12] as shown in Table 2. For example, the virtual addresses assigned to the 16 KB page 264 is depicted as a subblock 304 of the block 292c.

The pages which are 16 KB in size have physical addresses stored in translation entry segment 300c. For example, the physical address of the 16 KB page 264 is stored in an address translation entry 280g. The translation entry segment 300c which includes the entry 280g, has a base translation entry index of 192 as shown in Table 2, because there are 192 translation entries preceding in the data structure table 280. These preceding 192 entries are the 64 translation entries (translation entry index 0 to translation entry index 63) for the 64 larger pages of 64 KB size, and the 128 translation entries (translation entry index 64 to translation entry index 191) for the 128 larger pages of 32 KB size as shown in Table 1.

Figure 7:
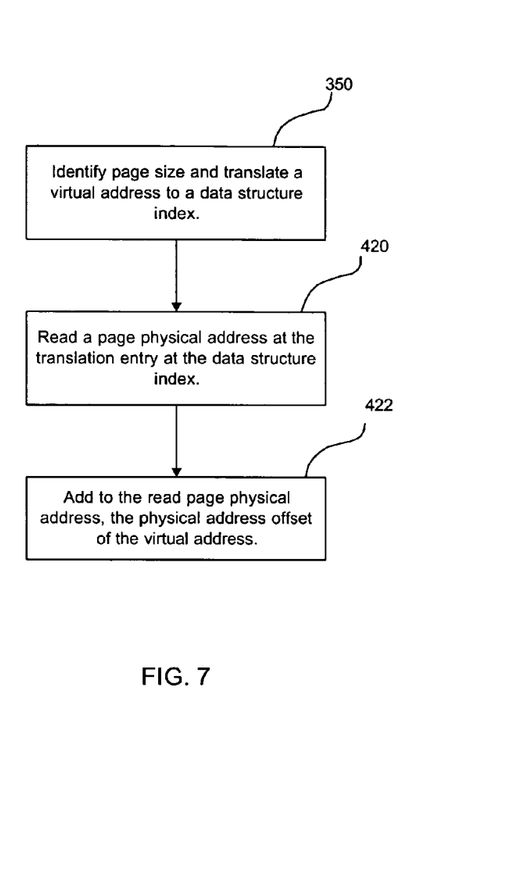
FIG. 7 illustrates one embodiment of operations performed to translate a virtual address of a memory location within a page of various sizes, to a physical memory address.

FIG. 7 shows one example of operations of an I/O device such as the an I/O device 110, to translate a virtual address of a memory location to a physical address of that memory location. In this example, a virtual address such as a virtual address 296 includes a page virtual address 296a of the page containing the memory location, and a physical address offset 296b within that page. The size of the page is identified (block 350) and the page virtual address 296a may be translated to a data structure table index, such as a TE index 0, TE index 1 . . . TE index n of a data structure table 280. Each data structure table index, TE index 0, TE index 1 . . . TE index n, includes a base translation entry index 302a, 302b, 302c, 302d and 302e. Each base translation entry index 302a, 302b, 302c, 302d and 302e, combined with a translation entry index offset such as a translation entry index offset 360, provides a data structure table index, such as a TE index 0, TE index 1 . . . TE index n. Each data structure table index, such as a TE index 0, TE index 1 . . . TE index n identifies a particular data structure translation entry 280a, 280b, . . . 280n, such as the translation entry 280g.

In the illustrated embodiment, the size of the page containing the memory location may be identified by comparing bits [24:12] of the page virtual address 296a to bits [24:12] of the base virtual addresses of the Private Memory Descriptor Table (Table 2). Starting with the smallest page size first, the page size is identified as the page size associated with the first base virtual address in which bits [24:12] of the page virtual address 296a are greater or equal to bits [24:12] of the base virtual address in the Private Memory Descriptor Table (Table 2). Thus, for example, a page virtual address having bits [24:12] 0x08F0 can identify the page size as being 16 KB since the first base virtual address, starting with the smallest page size first, in which the virtual address [24:12] 0x08F0 is greater than the base virtual address [24:12], is the base virtual address 0x0800 associated with the 16 KB page size as shown in Table 2.

Having identified the page size of the page containing the memory location addressed by the virtual address being translated, a base translation entry index 302a, 302b, 302c, 302d and 302e may be identified for that page size by examining the Private Memory Descriptor Table (Table 2). Thus, for example, the Private Memory Descriptor Table (Table 2) identifies the 16 KB page size having an associated base translation entry index 302a, 302b, 302c, 302d and 302e which is equal to 192 in this example. As set forth above, the base translation entry index 302a, 302b, 302c, 302d and 302e identifies the data structure table segment 300a, 300b, 300c, 300d and 300e containing the base physical addresses of the pages of the associated virtual address block 292a, 292b, 292c, 292d, 292e. In this example, the base translation entry index value of 192 identifies the data structure table segment 300c which contains the base physical addresses of the 16 KB pages addressed by the virtual address block 292c of the virtual address space 292.

In addition to the base translation entry index 302a, 302b, 302c, 302d and 302e for the particular page size, a base translation entry index offset may also be identified for the particular page. The base translation entry index offset, when combined with a base translation entry index 302a, 302b, 302c, 302d and 302e, identifies the particular data structure translation entry 280a, 280b, . . . 280n, which contains the base physical address of the particular page containing the particular memory location addressed by the virtual address being translated. For example, the base translation entry index offset 360 when combined with the base translation entry index 302c, identifies the particular data structure translation entry 302g which contains the base physical address of the particular 16 KB size page containing the memory location being addressed by the virtual address being translated.

In the illustrated embodiment, the base translation entry index offset may be translated from the virtual address. In this example, the identified base virtual address 294a, 294b . . . 294e of the virtual address block 292a, 292b . . . 292e, for the identified page size, is subtracted from the virtual address being translated to provide a virtual address offset. For example a virtual address 400 may be within the subblock 304 of the virtual address block 292c. Subtracting the base virtual address 294c from the virtual address 400 yields a virtual address offset 402.

As previously mentioned, a virtual address includes a physical address offset 296b which, as shown in FIG. 6, occupies the P least significant bits in the illustrated embodiment. In this example, the size of the page containing the memory location addressed by the virtual address being translated is equal to $2^P$ memory locations. This physical address offset may be removed from the virtual address offset by shifting the virtual address offset P bits to the right to derive the translation entry index offset. Thus, for example, for the virtual address 400, the page size is identified as 16 KB or $2^{14}$ KB. The virtual address offset 402 may be shifted 14 bits to the right to provide the translation entry index offset 360.

The identified translation entry index offset may be combined with the identified base translation entry index 302a, 302b, 302c, 302d and 302e, to provide a translation entry index, TE index 0, TE index 1 . . . TE index n, which identifies the particular data structure translation entry 280a, 280b, . . . 280n, which contains the base physical address of the particular page containing the particular memory location addressed by the virtual address being translated. For example, the base translation entry index offset 360 when combined with the base translation entry index 302c, identifies the particular data structure translation entry 302g which contains the base physical address 282 of the particular 16 KB size page 264 containing the memory location being addressed by the virtual address 400 being translated.

It is appreciated that a virtual address of a page may be converted to a data structure table index using a variety of techniques, depending upon the particular application. Factors affecting the particular technique utilized include the arrangement of the data structure table containing the address translation data and the format of the virtual addresses.

In another operation, the base physical address of the page may be read (block 420, FIG. 7) from the data structure table 280, using the data structure translation entry index translated from the virtual address of the memory location within the particular page. The read page base physical address may be added (block 422) to the physical address offset 296b of the virtual address 296 being translated to provide the physical address of the memory location within the memory portion 260.

For example, the page base physical address 282 may be read from the address translation entry 280g, using the translation entry index g translated from the virtual address 400. The physical address offset 299 obtained from the portion 296b of the virtual address 400, combined with the page base physical address 282 read from the translation entry 280g, provides the physical address 298 of the memory location addressed by the virtual address 400.

Additional Embodiment Details

The described techniques for managing memory may be embodied as a method, apparatus or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are embodied may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

In the described embodiments, certain operations were described as being performed by the operating system 118, system host 112, device driver 120, or the I/O device 110. In alterative embodiments, operations described as performed by one of these may be performed by one or more of the operating system 118, device driver 120, or the I/O device 110. For example, memory operations described as being performed by the driver may be performed by the host. In the described embodiments, a transport protocol layer and one or more RDMA protocol layers were embodied in the I/O device 110 hardware. In alternative embodiments, one or more of these protocol layer may be embodied in the device driver 120 or operating system 118.

In certain embodiments, the device driver and network controller embodiments may be included in a computer system including a storage controller, such as a SCSI, Integrated Drive Electronics (IDE), Redundant Array of Independent Disk (RAID), etc., that manages access to a nonvolatile storage device, such as a magnetic disk drive, tape media, optical disk, etc. In alternative embodiments, the network controller embodiments may be included in a system that does not include a storage controller, such as certain hubs and switches.

In certain embodiments, the device driver and network controller embodiments may be embodied in a computer system including a video controller to render information to display on a monitor coupled to the computer system including the device driver and network controller, such as a computer system comprising a desktop, workstation, server, mainframe, laptop, handheld computer, etc. Alternatively, the network controller and device driver embodiments may be embodied in a computing device that does not include a video controller, such as a switch, router, etc.

In certain embodiments, the network controller may be configured to transmit data across a cable connected to a port on the network controller. Alternatively, the network controller embodiments may be configured to transmit data over a wireless network or connection, such as wireless LAN, Bluetooth, etc.

The illustrated logic of FIGS. 4 and 7 shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 8:
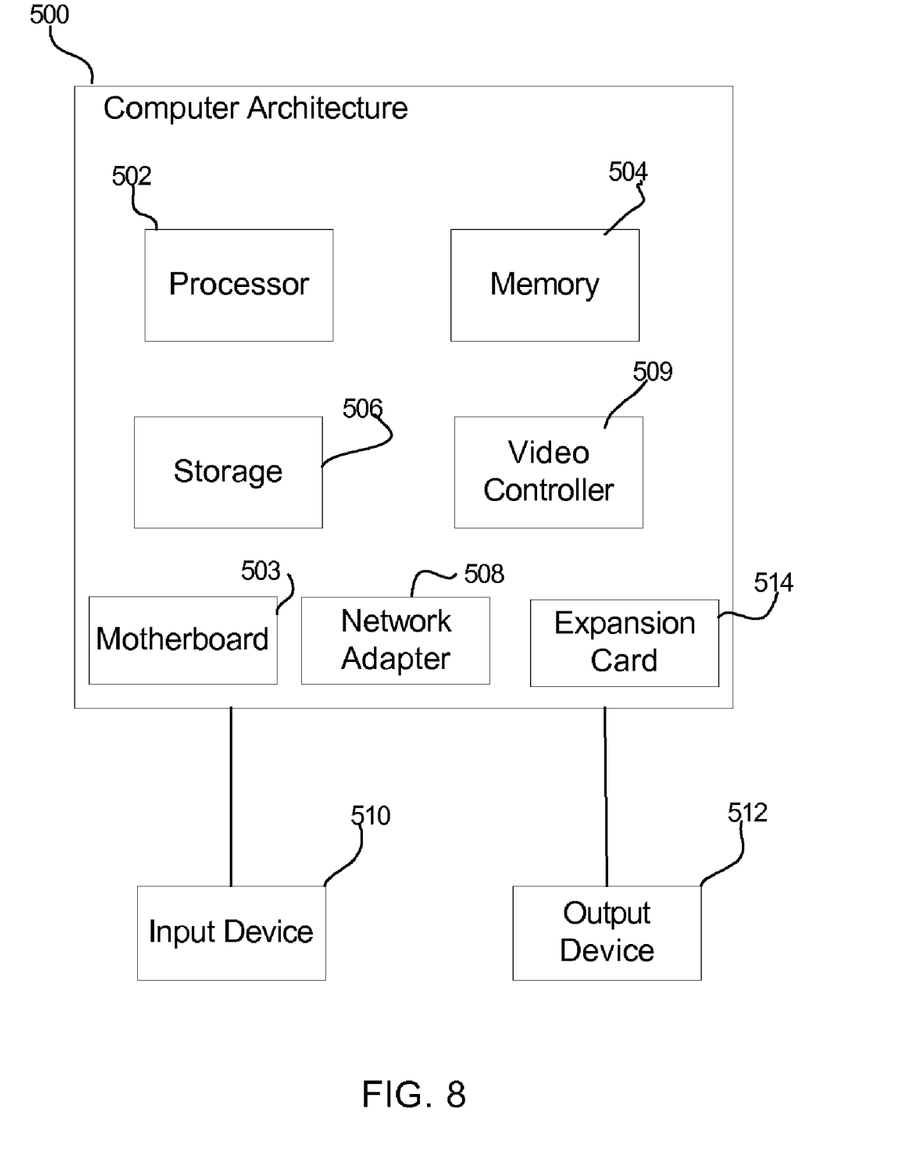
FIG. 8 illustrates an architecture that may be used with the described embodiments.

FIG. 8 illustrates one embodiment of a computer architecture 500 of the network components, such as the hosts and storage devices shown in FIG. 3. The architecture 500 may include a processor 502 (e.g., a microprocessor) which may be mounted on a motherboard 503, a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network controller 508 to enable communication with a network, such as an Ethernet, a Fibre Channel Arbitrated Loop, etc. Further, the architecture may, in certain embodiments, include a video controller 509 to render information on a display monitor, where the video controller 509 may be embodied on a video card or integrated on integrated circuit components mounted on the motherboard. As discussed, certain of the network devices may have multiple network cards or controllers. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The network controller 508 may embodied on an expansion card 514 such as a network card, such as a Peripheral Component Interconnect (PCI) card, PCI-express, or some other I/O card, or on integrated circuit components mounted on the motherboard 503.

The foregoing description of various embodiments has been presented for the purposes of illustration and description. It is not intended to be exhaustive or to limit to the precise form disclosed. Many modifications and variations are possible in light of the above teaching.

What is claimed is:

1. A method, comprising:
identifying a plurality of pages of memory locations allocated to an input/output (I/O) device, wherein the memory locations within each page are contiguous and wherein each page of a plurality of said pages is of a first size and each page of a plurality of said pages is of a second size different from said first size;
for each identified page, storing in a translation entry of a data structure table, a physical address of an identified page;
assigning each identified page a page virtual address which identifies a data structure translation entry in which is stored the physical address of the identified page; and
assigning each memory location a memory location virtual address which includes the page virtual address of the page containing the memory location, and a physical address offset relative to the page physical address of the page containing the memory location;
wherein the size of the page containing the memory location addressed by the assigned memory location virtual address is equal to $2^P$ memory locations and the physical address offset of the memory location addressed by the memory location virtual address is defined by the P least significant bits of the memory location virtual address, wherein the assigned memory location virtual addresses define a virtual address space which includes a plurality of blocks of virtual addresses and wherein the virtual addresses assigned to memory pages of the same size are within the same block of virtual addresses, wherein the data structure table has a plurality of segments of translation entries, wherein for each translation entry of a particular segment, the size of the page addressed by each entry of the particular segment is the same, wherein each data structure table segment of translation entries is assigned a base virtual address of said virtual address space, and wherein each data structure table segment of translation entries is assigned a base translation entry index which for a particular data structure table segment, equals the number of translation entries for pages of greater size than the size of the pages addressed by the translation entries of the particular data structure table segment.

2. The method of claim 1 wherein the virtual address of each memory location includes a translation entry index offset which when combined with a base translation entry index, identifies the translation entry containing the physical address of the page of memory locations containing the memory location addressed by the virtual address.

3. The method of claim 1 further comprising translating the memory location virtual address of a particular memory location to the physical address of the particular memory location.

4. The method of claim 3 wherein the memory location virtual address translating includes translating the page virtual address of the memory location virtual address to the physical address of a particular page of memory locations containing the particular memory location.

5. The method of claim 4 wherein the memory location virtual address translating includes combining the physical address of the particular page of memory locations with the physical address offset within the particular page of memory locations to identify the physical address of the particular memory location.

6. The method of claim 5 wherein the page virtual address translating includes translating the page virtual address of the particular page of memory locations to a base translation entry index which identifies a particular data structure table segment and to a translation entry index offset which identifies a particular data structure translation entry within the particular data structure table segment wherein the particular data structure translation entry contains the physical address of the particular page of memory locations.

7. The method of claim 6 wherein the page virtual address translating includes identifying the size of the particular page containing the particular memory location addressed by the memory location virtual address.

8. The method of claim 7 wherein said particular page size identifying includes identifying a virtual address space portion containing the memory location virtual address of the particular memory location.

9. The method of claim 8 wherein the physical address identifying includes identifying the base virtual address of the data structure table segment containing the translation entry for the particular page containing the particular memory location addressed by the memory location virtual address.

10. The method of claim 9 wherein the page virtual address translating includes subtracting the identified base virtual address of the data structure table segment, from the memory location virtual address of the particular memory location to provide a virtual address offset and shifting the virtual address offset P bits to the right to derive the translation entry index offset, and wherein the page virtual address translating includes combining the derived translation entry index offset with the base translation entry index to provide a translation entry index which identifies the translation entry containing the physical address of the particular page containing the particular memory location addressed by the memory location virtual address.

11. The method of claim 10 wherein said memory location virtual address translating includes reading the page physical address at the translation entry at the identified translation entry index and adding to the read page physical address, the physical address offset of the memory location virtual address of the particular memory location.

12. An input/output (I/O) device for use with a memory having a plurality of memory locations, comprising:
  logic adapted to:
    maintain a data structure table comprising a plurality of translation entries;
    identify a plurality of pages of said memory locations allocated to said I/O device, wherein the memory locations within each page are contiguous and wherein each page of a plurality of said pages is of a first size and each page of a plurality of said pages is of a second size different from said first size;
    for each identified page, store in a translation entry of said data structure table, a physical address of an identified page;
    assign each identified page a page virtual address which identifies a data structure translation entry in which is stored the physical address of the identified page; and
    assign each memory location a memory location virtual address which includes the page virtual address of the page containing the memory location, and a physical address offset relative to the page physical address of the page containing the memory location, wherein the size of the page containing the memory location addressed by the assigned memory location virtual address is equal to $2^P$ memory locations and the physical address offset of the memory location addressed by the memory location virtual address is defined by the P least significant bits of the memory location virtual address, wherein the assigned memory location virtual addresses define a virtual address space which includes a plurality of blocks of virtual addresses and wherein the virtual addresses assigned to memory pages of the same size are within the same block of virtual addresses, wherein the data structure table has a plurality of segments of translation entries, wherein for each translation entry of a particular segment, the size of the page addressed by each entry of the particular segment is the same; wherein each data structure table segment of translation entries is assigned a base virtual address of said virtual address space, and wherein each data structure table segment of translation entries is assigned a base translation entry index which for a particular data structure table segment, equals the number of translation entries for pages of greater size than the size of the pages addressed by the translation entries of the particular data structure table segment.

13. The I/O device of claim 12 wherein the virtual address of each memory location includes a translation entry index offset which when combined with a base translation entry index, identifies the translation entry containing the physical address of the page of memory locations containing the memory location addressed by the virtual address.

14. The I/O device of claim 13 wherein the logic is further adapted to translate the memory location virtual address of a particular memory location to the physical address of the particular memory location.

15. The I/O device of claim 14 wherein the memory location virtual address translating includes translating the page virtual address of the memory location virtual address to the physical address of a particular page of memory locations containing the particular memory location.

16. The I/O device of claim 15 wherein the memory location virtual address translating includes combining the physical address of the particular page of memory locations with the physical address offset within the particular page of memory locations to identify the physical address of the particular memory location.

17. The I/O device of claim 16 wherein the page virtual address translating includes translating the page virtual address of the particular page of memory locations to a base translation entry index which identifies a particular data structure table segment and to a translation entry index offset which identifies a particular data structure translation entry within the particular data structure table segment wherein the particular data structure translation entry contains the physical address of the particular page of memory locations.

18. The I/O device of claim 17 wherein the page virtual address translating includes identifying the size of the particular page containing the particular memory location addressed by the memory location virtual address.

19. The I/O device of claim 18 wherein said particular page size identifying includes identifying a virtual address space portion containing the memory location virtual address of the particular memory location.

20. The I/O device of claim 19 wherein the physical address identifying includes identifying the base virtual address of the data structure table segment containing the translation entry for the particular page containing the particular memory location addressed by the memory location virtual address.

21. The I/O device of claim 20 wherein the page virtual address translating includes subtracting the identified base virtual address of the data structure table segment, from the memory location virtual address of the particular memory location to provide a virtual address offset and shifting the virtual address offset P bits to the right to derive the translation entry index offset, and wherein the page virtual address translating includes combining the derived translation entry index offset with the base translation entry index to provide a translation entry index which identifies the translation entry containing the physical address of the particular page containing the particular memory location addressed by the memory location virtual address.

22. The I/O device of claim 21 wherein said memory location virtual address translating includes reading the page physical address at the translation entry at the identified translation entry index and adding to the read page physical address, the physical address offset of the memory location virtual address of the particular memory location.

23. A system for use with a memory having a plurality of memory locations, comprising:
at least one memory which includes an operating system;
a motherboard;
a processor mounted on the motherboard and coupled to the memory;
an expansion card coupled to said motherboard;
a controller mounted on said expansion card wherein said memory includes a plurality of memory locations adapted to be allocated to said controller; and
a device driver executable by the processor in the memory for said controller wherein the device driver is adapted to:
maintain in said memory a data structure table comprising a plurality of translation entries;
identify a plurality of pages of said memory locations allocated to said controller, wherein the memory locations within each page are contiguous and wherein each page of a plurality of said pages is of a first size and each page of a plurality of said pages is of a second size different from said first size;
for each identified page, store in a translation entry of said data structure table, a physical address of an identified page;
assign each identified page a page virtual address which identifies a data structure translation entry in which is stored the physical address of the identified page; and
assign each memory location a memory location virtual address which includes the page virtual address of the page containing the memory location, and a physical address offset relative to the page physical address of the page containing the memory location; wherein the size of the page containing the memory location addressed by the assigned memory location virtual address is equal to $2^P$ memory locations and the physical address offset of the memory location addressed by the memory location virtual address is defined by the P least significant bits of the memory location virtual address; wherein the assigned memory location virtual addresses define a virtual address space which includes a plurality of blocks of virtual addresses and wherein the virtual addresses assigned to memory pages of the same size are within the same block of virtual addresses; wherein the data structure table has a plurality of segments of translation entries, wherein for each translation entry of a particular segment, the size of the page addressed by each entry of the particular segment is the same, wherein each data structure table segment of translation entries is assigned a base virtual address of said virtual address space, and wherein each data structure table segment of translation entries is assigned a base translation entry index which for a particular data structure table segment, equals the number of translation entries for pages of greater size than the size of the pages addressed by the translation entries of the particular data structure table segment.

24. The system of claim 23 wherein the virtual address of each memory location includes a translation entry index offset which when combined with a base translation entry index, identifies the translation entry containing the physical address of the page of memory locations containing the memory location addressed by the virtual address.

25. The system of claim 24 wherein the controller is adapted to translate the memory location virtual address of a particular memory location to the physical address of the particular memory location.

26. The system of claim 25 wherein the memory location virtual address translating includes translating the page virtual address of the memory location virtual address to the physical address of a particular page of memory locations containing the particular memory location.

27. The system of claim 26 wherein the memory location virtual address translating includes combining the physical address of the particular page of memory locations with the physical address offset within the particular page of memory locations to identify the physical address of the particular memory location.

28. The system of claim 26 wherein the page virtual address translating includes translating the page virtual address of the particular page of memory locations to a base translation entry index which identifies a particular data structure table segment and to a translation entry index offset which identifies a particular data structure translation entry within the particular data structure table segment wherein the particular data structure translation entry contains the physical address of the particular page of memory locations.

29. The system of claim 28 wherein the page virtual address translating includes identifying the size of the particular page containing the particular memory location addressed by the memory location virtual address.

30. The system of claim 29 wherein said particular page size identifying includes identifying a virtual address space portion containing the memory location virtual address of the particular memory location.

31. The system of claim 30 wherein the physical address identifying includes identifying the base virtual address of the data structure table segment containing the translation entry for the particular page containing the particular memory location addressed by the memory location virtual address.

32. The system of claim 31 wherein the page virtual address translating includes subtracting the identified base virtual address of the data structure table segment, from the memory location virtual address of the particular memory location to provide a virtual address offset and shifting the virtual address offset P bits to the right to derive the translation entry index offset, and wherein the page virtual address translating includes combining the derived translation entry index offset with the base translation entry index to provide a translation entry index which identifies the translation entry containing the physical address of the particular page containing the particular memory location addressed by the memory location virtual address.

33. The system of claim 32 wherein said memory location virtual address translating includes reading the page physical address at the translation entry at the identified translation entry index and adding to the read page physical address, the physical address offset of the memory location virtual address of the particular memory location.

34. An article comprising a storage medium for use with a controller and a memory having a plurality of memory locations, wherein the storage medium comprises machine readable instructions stored thereon to:
   maintain a data structure table comprising a plurality of translation entries;
   identify a plurality of pages of said memory locations allocated to said controller, wherein the memory locations within each page are contiguous and wherein each page of a plurality of said pages is of a first size and each page of a plurality of said pages is of a second size different from said first size;
   for each identified page, store in a translation entry of said data structure table, a physical address of an identified page;
   assign each identified page a page virtual address which identifies a data structure translation entry in which is stored the physical address of the identified page; and
   assign each memory location a memory location virtual address which includes the page virtual address of the page containing the memory location, and a physical address offset relative to the page physical address of the page containing the memory location;
   wherein the size of the page containing the memory location addressed by the assigned memory location virtual address is equal to $2^P$ memory locations and the physical address offset of the memory location addressed by the memory location virtual address is defined by the P least significant bits of the memory location virtual address, the assigned memory location virtual addresses define a virtual address space which includes a plurality of blocks of virtual addresses and wherein the virtual addresses assigned to memory pages of the same size are within the same block of virtual addresses; and
   wherein the data structure table has a plurality of segments of translation entries, wherein for each translation entry of a particular segment, the size of the page addressed by each entry of the particular segment is the same, each data structure table segment of translation entries is assigned a base virtual address of said virtual address space, each data structure table segment of translation entries is assigned a base translation entry index which for a particular data structure table segment, equals the number of translation entries for pages of greater size than the size of the pages addressed by the translation entries of the particular data structure table segment, and the virtual address of each memory location includes a translation entry index offset which when combined with a base translation entry index, identifies the translation entry containing the physical address of the page of memory locations containing the memory location addressed by the virtual address.

35. The article of claim 34 wherein the storage medium further comprises machine readable instructions stored thereon to translate the memory location virtual address of a particular memory location to the physical address of the particular memory location.

36. The article of claim 35 wherein the memory location virtual address translating includes translating the page virtual address of the memory location virtual address to the physical address of a particular page of memory locations containing the particular memory location, the memory location virtual address translating includes combining the physical address of the particular page of memory locations with the physical address offset within the particular page of memory locations to identify the physical address of the particular memory location, the page virtual address translating includes translating the page virtual address of the particular page of memory locations to a base translation entry index which identifies a particular data structure table segment and to a translation entry index offset which identifies a particular data structure translation entry within the particular data structure table segment ii wherein the particular data structure translation entry contains the physical address of the particular page of memory locations, and the page virtual address translating includes identifying the size of the particular page containing the particular memory location addressed by the memory location virtual address.

37. The article of claim 36 wherein said particular page size identifying includes identifying a virtual address space portion containing the memory location virtual address of the particular memory location, the physical address identifying includes identifying the base virtual address of the data structure table segment containing the translation entry for the particular page containing the particular memory location addressed by the memory location virtual address, the page virtual address translating includes subtracting the identified base virtual address of the data structure table segment, from the memory location virtual address of the particular memory location to provide a virtual address offset and shifting the virtual address offset P bits to the right to derive the translation entry index offset, and wherein the page virtual address translating includes combining the derived translation entry index offset with the base translation entry index to provide a translation entry index which identifies the translation entry containing the physical address of the particular page containing the particular memory location addressed by the memory location virtual address, and said memory location virtual address translating includes reading the page physical address at the translation entry at the identified translation entry index and adding to the read page physical address, the physical address offset of the memory location virtual address of the particular memory location.

* * * * *

UNITED STATES PATENT AND TRADEMARK OFFICE
CERTIFICATE OF CORRECTION

PATENT NO. : 7,370,174 B2  
APPLICATION NO. : 11/029917  
DATED : May 6, 2008  
INVENTOR(S) : A. L. Arizpe et al.

Page 1 of 1

It is certified that error appears in the above-identified patent and that said Letters Patent is hereby corrected as shown below:

In the Claims

Claim 3, Column 14, line 51, "claim 1 further" should read --claim 2 further--.

Claim 36, Column 20, line 22, "segment ii wherein" should read --segment wherein--.

Signed and Sealed this
Seventh Day of October, 2014

Michelle K. Lee
*Deputy Director of the United States Patent and Trademark Office*